(12) United States Patent
Yamamura

(10) Patent No.: US 10,268,206 B2
(45) Date of Patent: Apr. 23, 2019

(54) CONTROL APPARATUS FOR UTILITY VEHICLE

(71) Applicant: Honda Motor Co., Ltd., Tokyo (JP)

(72) Inventor: Makoto Yamamura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 179 days.

(21) Appl. No.: 15/473,467

(22) Filed: Mar. 29, 2017

(65) Prior Publication Data
US 2017/0285653 A1    Oct. 5, 2017

(30) Foreign Application Priority Data

Mar. 31, 2016 (JP) ................. 2016-071940

(51) Int. Cl.
| | |
|---|---|
| G05D 1/02 | (2006.01) |
| A01D 34/00 | (2006.01) |
| A01D 34/78 | (2006.01) |
| A01D 69/02 | (2006.01) |
| B60K 1/02 | (2006.01) |
| B60K 7/00 | (2006.01) |
| G01C 21/08 | (2006.01) |
| A01D 34/74 | (2006.01) |
| A01D 101/00 | (2006.01) |
| B60K 1/04 | (2019.01) |
| B60L 11/18 | (2006.01) |
| B60R 16/02 | (2006.01) |
| B60R 21/0136 | (2006.01) |
| B60R 21/01 | (2006.01) |

(52) U.S. Cl.
CPC ......... *G05D 1/0265* (2013.01); *A01D 34/008* (2013.01); *A01D 34/78* (2013.01); *A01D 69/02* (2013.01); *B60K 1/02* (2013.01); *B60K 7/0007* (2013.01); *G01C 21/08* (2013.01); *G05D 1/0225* (2013.01); *A01D 34/74* (2013.01); *A01D 2101/00* (2013.01); *B60K 2001/0416* (2013.01); *B60L 11/1818* (2013.01); *B60L 2200/40* (2013.01); *B60L 2210/30* (2013.01); *B60R 16/0207* (2013.01); *B60R 21/0136* (2013.01); *B60R 2021/01013* (2013.01)

(58) Field of Classification Search
CPC ... G05D 1/0265; G05D 1/0225; A01D 34/008
See application file for complete search history.

(56) References Cited

FOREIGN PATENT DOCUMENTS

JP    2013164741 A    8/2013

*Primary Examiner* — Anne M Antonucci
*Assistant Examiner* — Renee LaRose
(74) *Attorney, Agent, or Firm* — Duft & Bornsen, PC

(57) ABSTRACT

In an apparatus and method for controlling operation of a utility vehicle that detects a magnetic field generated by an area signal in electric current supplied from an electric power supply through a boundary wire and is driven by an electric motor powered by an onboard battery that is charged at a charging station. The vehicle runs within the working area based on the detected magnetic field and is provided with a socket to connect/disconnect supply of the electric current to the boundary wire. It is determined whether after power supply was once disconnected, the supply is reconnected. The area signal is inserted with a signal indicating the vehicle to return to the charging station when the power supply is reconnected. Operation of the motor is controlled to make the vehicle run to the charging station when the return instruction signal is inserted to the area signal.

12 Claims, 9 Drawing Sheets

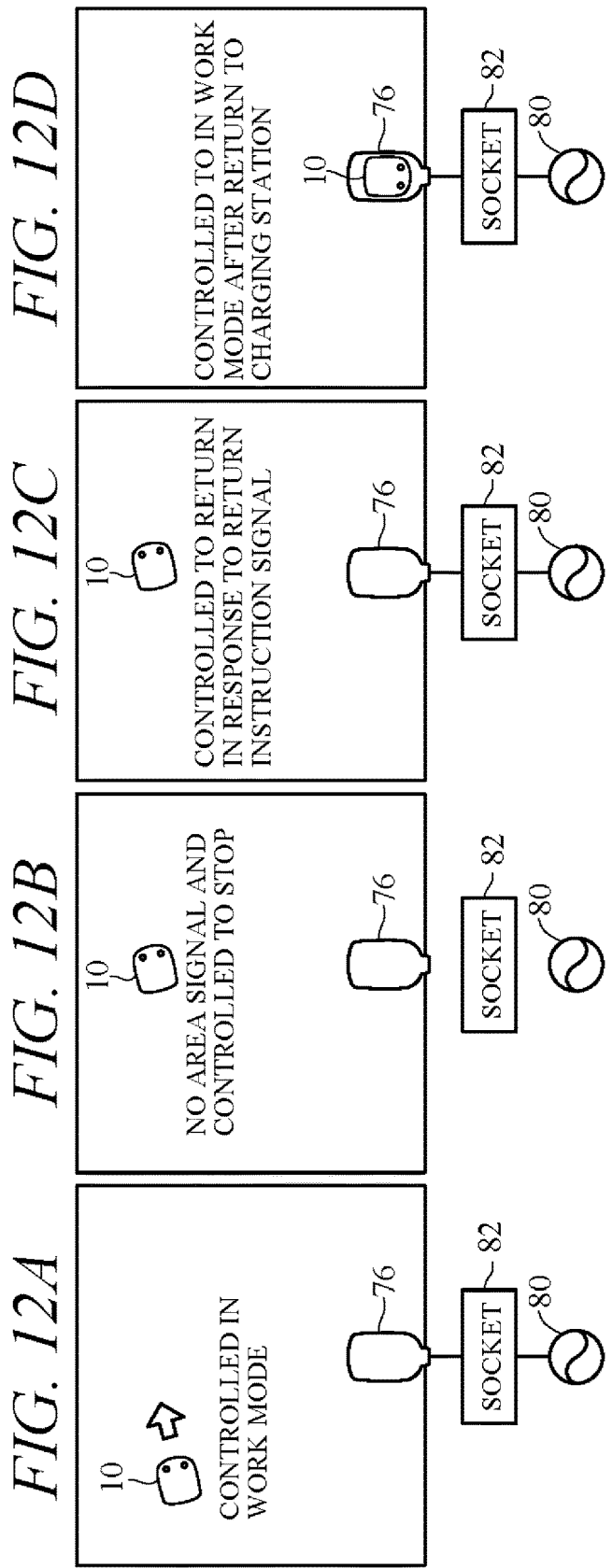

CONTROL APPARATUS FOR UTILITY VEHICLE

CROSS-REFERENCE TO RELATED APPLICATIONS

This application is based upon and claims the benefit of priority from Japanese Patent Application No. 2016-071940 filed on Mar. 31, 2016, the contents of which are incorporated herein by reference.

BACKGROUND OF THE INVENTION

Field of the Invention

This invention relates to a control apparatus for a utility vehicle, particularly to a control apparatus for a utility vehicle that performs work with a utility unit while being driven to run in a working area by an electric motor powered by an onboard battery and returns to a charging station to charge the onboard battery.

Description of Related Art

A prior art control apparatus for a utility vehicle of this type can be found, for example, in Japanese Unexamined Patent Publication No. 2013-164741. The prior art of the reference proposes a boundary wire layout configuration for suitably guiding the utility vehicle back to a charging station.

Although the reference teaches guidance of a utility vehicle when returning to a charging station to charge a battery, other cases also sometimes arise in which the utility vehicle has to be returned to the charging station because of bad weather or need of maintenance. The conventional way of dealing with such situations has been to install a station return switch operated by a user.

However, the provision of the station return switch is a problem because it adds to the number of physical components by that much, and also leads to additional structural enlargement owing to the need for a waterproof cover that arises because the charging station is usually installed outdoors.

SUMMARY OF THE INVENTION

Therefore, an object of this invention is to provide a control apparatus for a utility vehicle that can return the utility vehicle to a charging station as required without need for additional physical components.

In order to achieve the object, this invention provides an apparatus and method for controlling operation of a utility vehicle that detects a magnetic field generated by an area signal in electric current supplied from an electric power supply through a boundary wire and is driven by an electric motor powered by an onboard battery that is charged at a charging station. The vehicle runs within the working area based on the detected magnetic field and is provided with a connecting/disconnecting device to be operable by a user to connect/disconnect supply of the electric current from the electric power supply to the boundary wire. It is determined whether after power supply was once disconnected, the power supply is reconnected through the device, and a return instruction signal indicating the vehicle to return to the charging station is inserted to the area signal when the power supply is reconnected. Operation of the electric motor is controlled to make the vehicle run to the charging station when the return instruction signal is inserted to the area signal.

BRIEF DESCRIPTION OF THE DRAWINGS

The above and other objects and advantages will be more apparent from the following description and drawings, in which:

FIGS. 12A to 12D are explanatory diagrams explaining the operation illustrated in FIG. 11.

DETAILED DESCRIPTION OF THE INVENTION

A control apparatus for a utility vehicle according to an embodiment of this invention is explained with reference to the attached drawings in the following.

Figure 1:
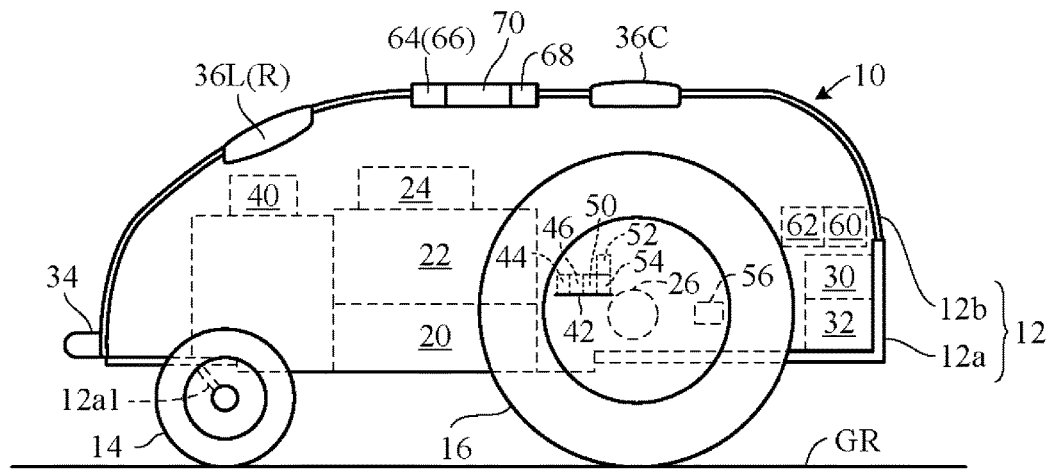
FIG. 1 is an overall schematic diagram showing a control apparatus for a utility vehicle according to an embodiment of this invention.
Figure 2:
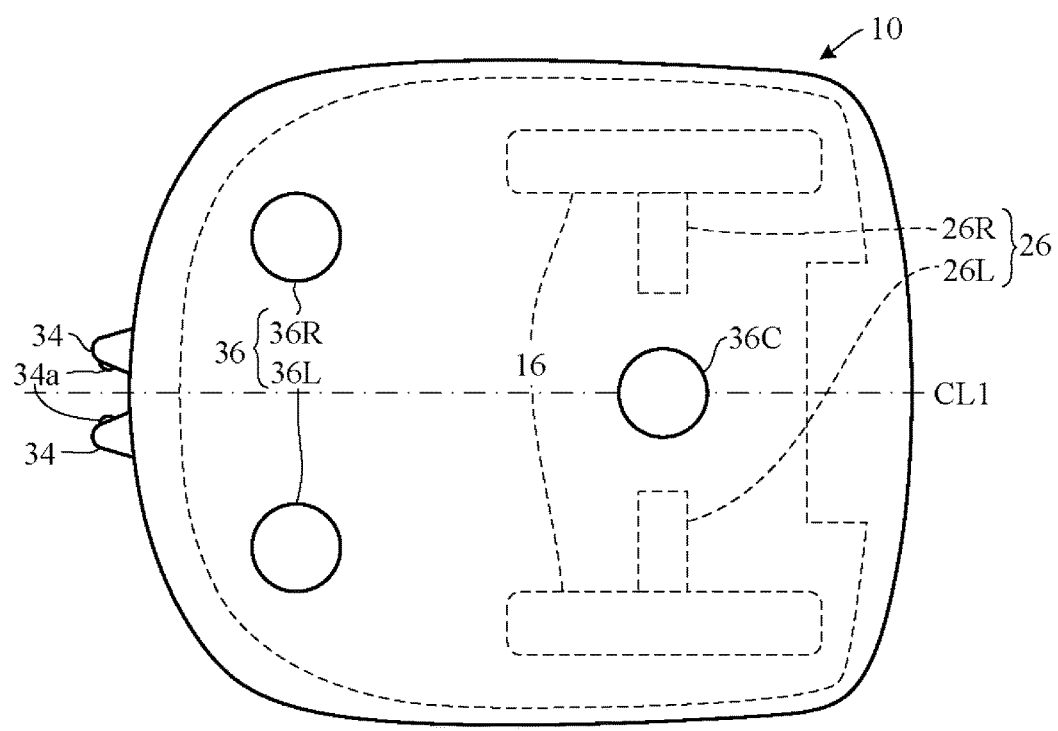
FIG. 2 is a plan view of the utility vehicle illustrated in FIG. 1.
Figure 3:
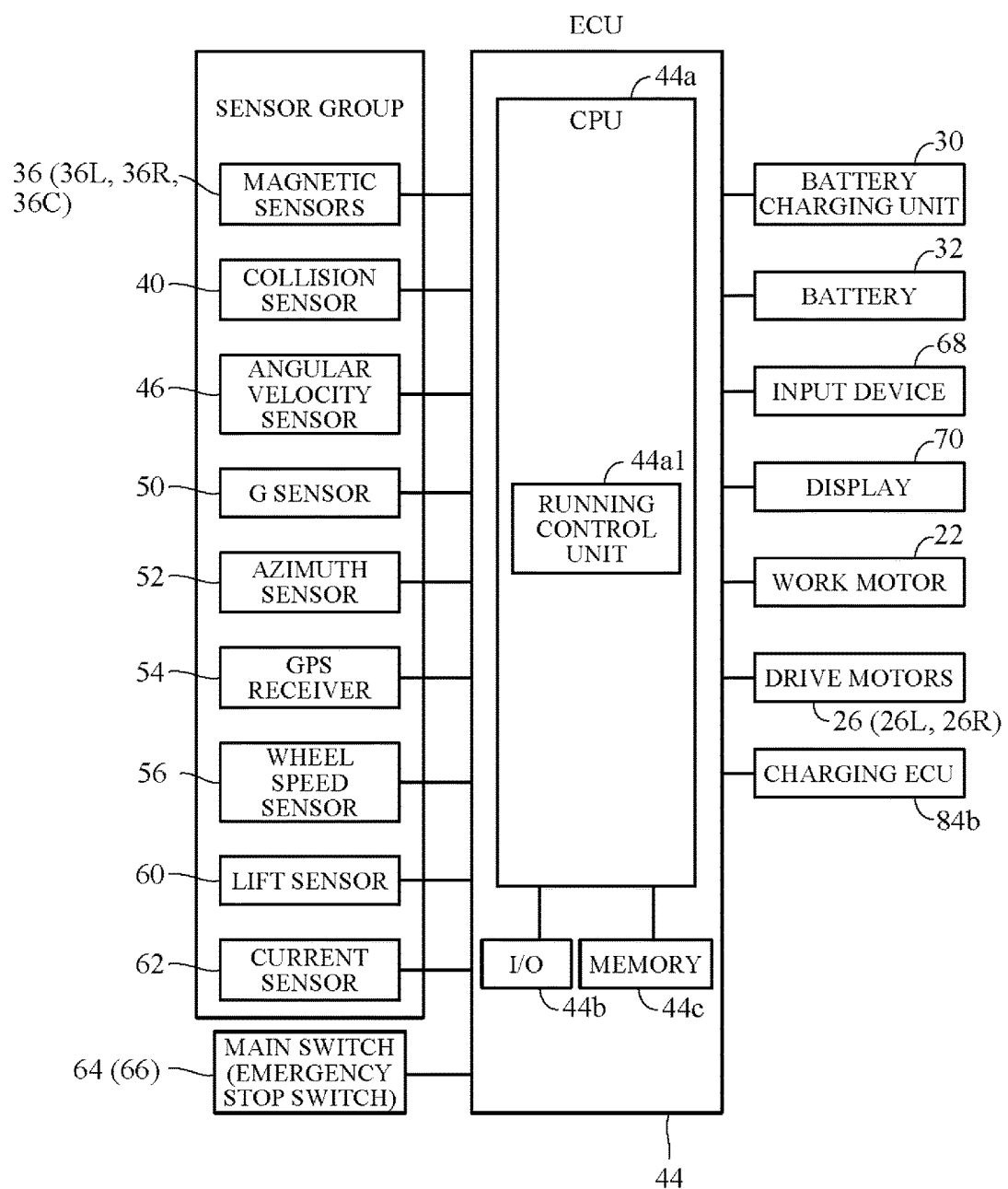
FIG. 3 is a block diagram showing inputs to an Electronic Control Unit installed in the utility vehicle illustrated in FIG. 1.

FIG. 1 is an overall schematic diagram showing a control apparatus for a utility vehicle according to an embodiment of this invention, FIG. 2 is a plan view schematically illustrating the configuration of the utility vehicle illustrated in FIG. 1; and FIG. 3 is a block diagram showing the configuration of the control apparatus of the utility vehicle according to the present embodiment including an Electronic Control Unit.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

A blade height regulation mechanism 24 manually operable by a user (operator) is connected to the blade 20. The blade height regulation mechanism 24 is equipped with a screw (not shown) and configured to enable the user to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the operator. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a center line CL running in the straight forward direction along the widthwise center of the vehicle 10. In addition, a third magnetic sensor 36C is installed on the center line CL1 at a location remote from the sensors 36L and 36R. The magnetic sensors 36 produces an output indicating magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the user or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotates one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
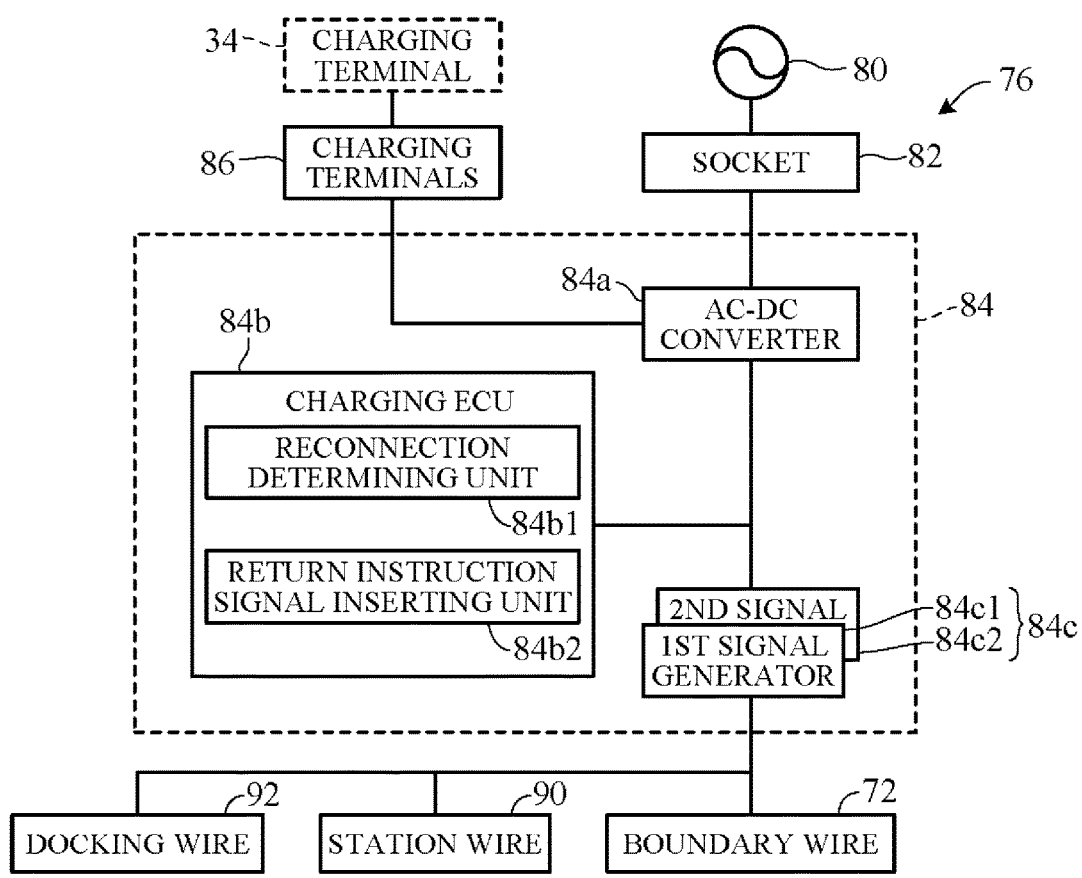
FIG. 5 is a block diagram showing configuration of a charging station of the utility vehicle shown in FIG. 4.

FIG. 5 is a block diagram showing electrical configuration of the charging station 76;

As shown in FIG. 5, the charging station 76 is equipped with a charger 84 connected through a socket (connecting/disconnecting device) 82 to a power supply (such as commercial power supply) 80, and a pair of charging terminals 86 connected to the charger 84 and connectable to contact contacts 34a (shown in FIG. 2) of the pair of charging terminals 34 of the vehicle 10.

The socket 82 is installed at a location between the electric power supply 80 and the boundary wire 72 to be operable by the user such that the user connects or disconnects supply of the electric current from the electric power supply 80 to the boundary wire 72.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging contacts 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-Dc converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

The first and second signal generators 84c1, 84c2 convert the direct current stepped down by the AC-DC converter 84a into an area signal 72a (FIG. 6) in continuance sequence of pulse train in response to the binary data pulses sent from the charging ECU 84b and supply the generated area signal 72a to the boundary wire 72, a station wire 90 for delineating the charging station 76a and a docking wire 92 for guiding the vehicle 10 to a charging position.

Figure 6:
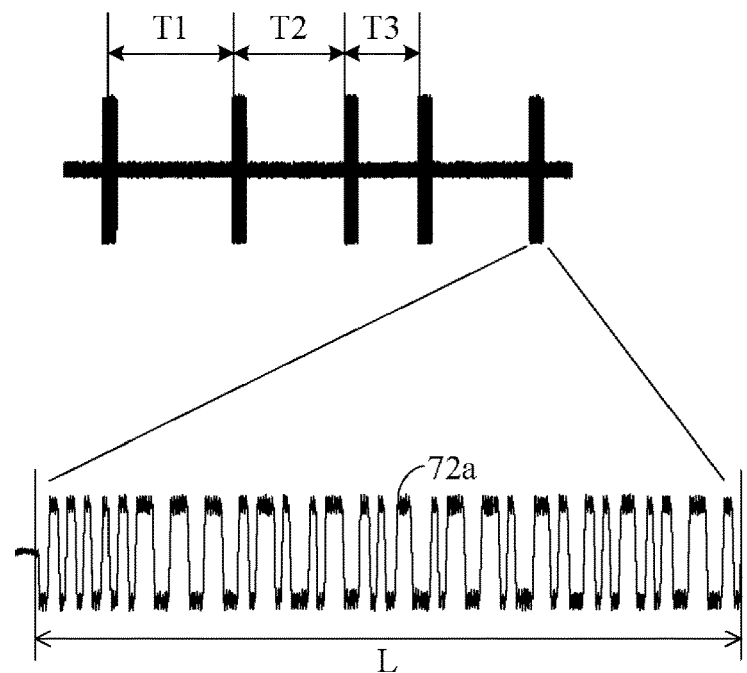
FIG. 6 is an explanatory diagram showing data signal of pulse train generated by a signal generator illustrated in FIG. 5.

FIG. 6 shows the area signal 72a of pulse train generated by the first signal generator 84c1 to be passed through the boundary wire 72 that is corresponding to the binary data pulses sent from the charging ECU 84b. As shown, the area signal 72a has a signal length L and is supplied to the boundary wire 72 at random periods Tn. Although not shown, the second signal generator 84c2 generates similar data signal.

Specifically, the area wire signal 72a comprise a predetermined bits of digital data signals such as 64-bit digital data signal. The first bit in the 64-bit data signal comprises one of a return instruction signal that instructs the vehicle 10 to return to the charging station 76 and a non-return instruction signal that does not instruct the vehicle 10 to return to the charging station 76. As will be mentioned later, the charging ECU 84b inserts the return instruction signal into a given bit, e.g., the first bit in the 64-bit signal when the vehicle 10 is to be returned to the charging station 72.

Figure 4:
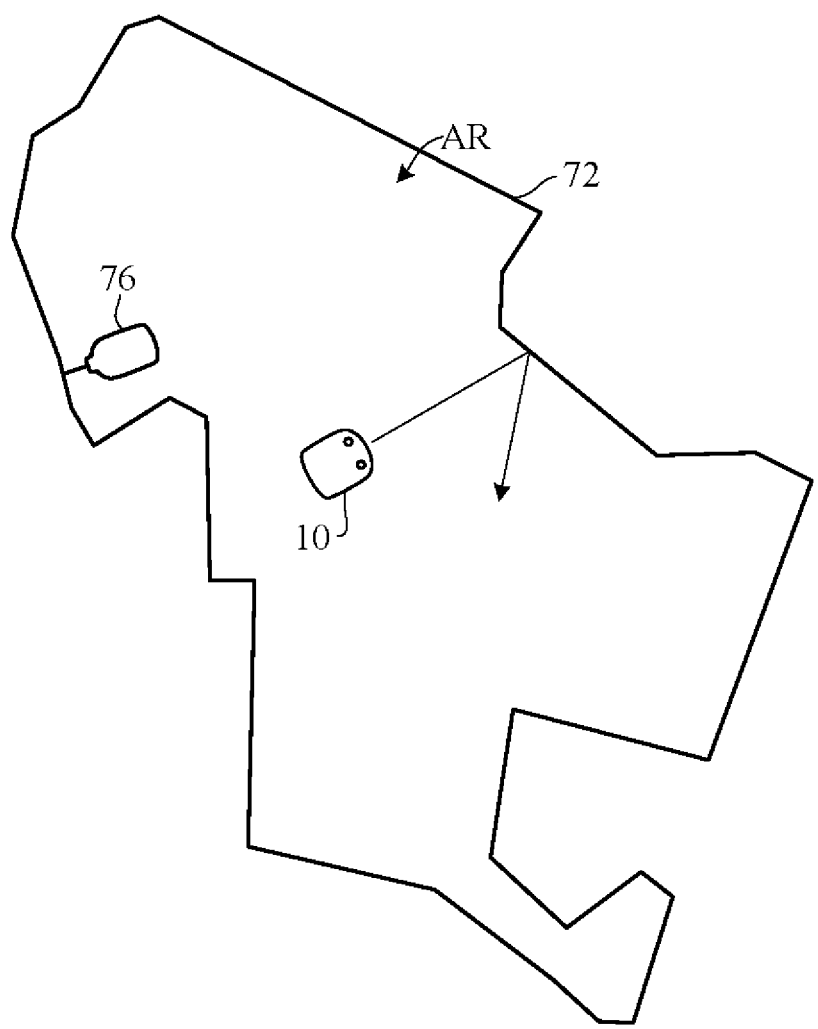
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
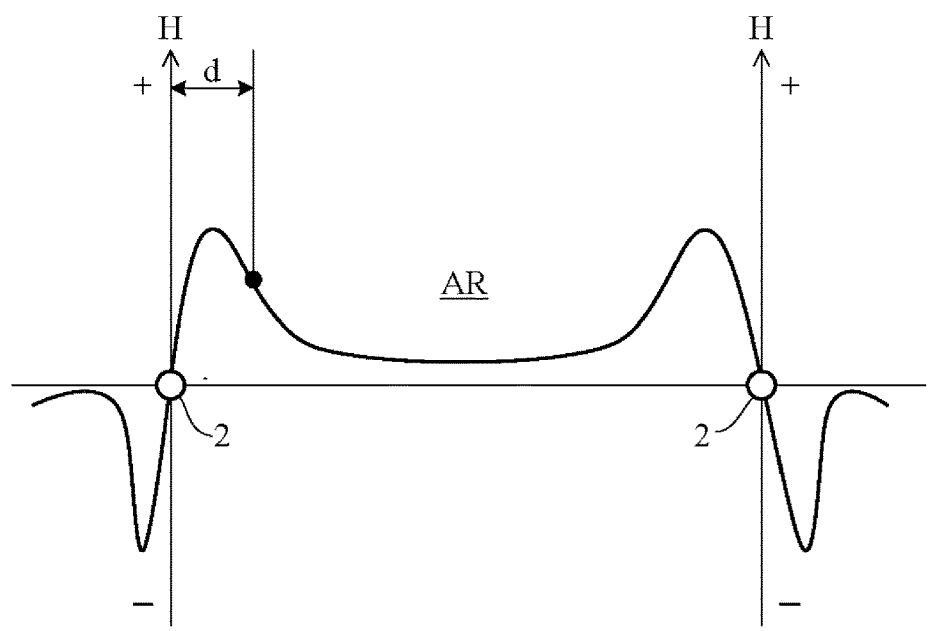
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
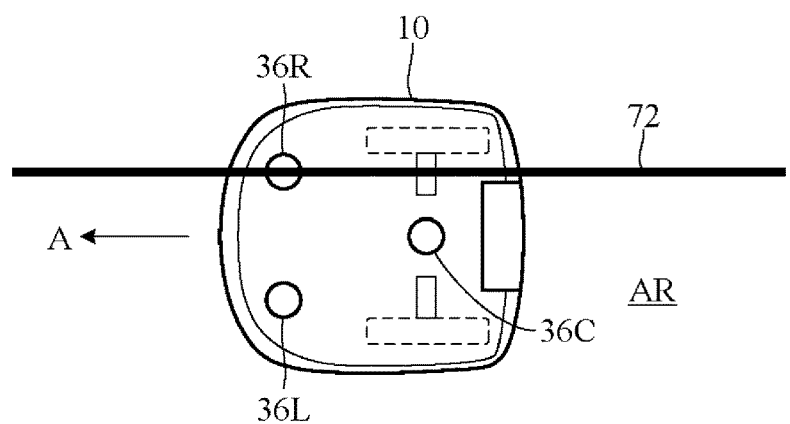
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Figure 9:
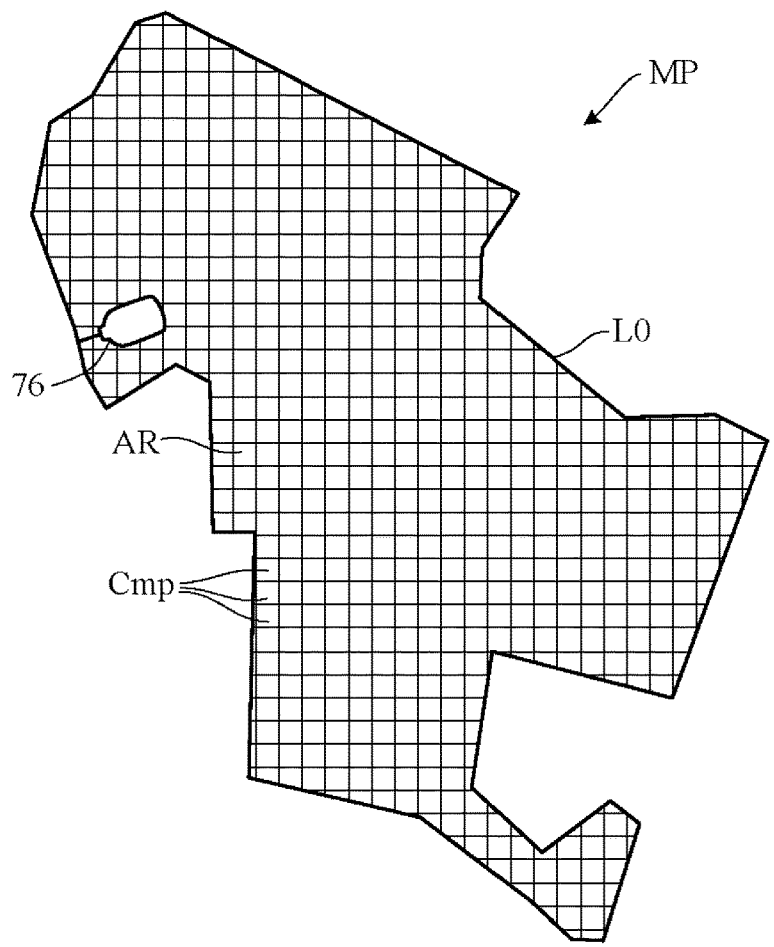
FIG. 9 is an explanatory diagram showing an example of a map of the working area illustrated in FIG. 4.

FIG. 9 is a diagram showing an example of the working area map MP. In the map MP, position of the boundary wire 72 is depicted as the boundary line (L0). More specifically, the map MP is configured by arraying the square cells Cmp in a grid pattern within a rectangular coordinate system plane including an X axis and a Y axis (XY plane) corresponding to inside of the working area AR. The plane is set with a reference orientation with respect to an origin corresponding to the position of the charging station 76. Each cell Cmp includes position data of X, Y coordinate. Size of the cells Cmp can be varied as appropriate and can, for example, be defined to coincide with working width of maximum outer diameter of blade 20.

Although running control of the vehicle 10 based on the map MP is performed overall by the ECU 44, the main feature of the control apparatus for a utility vehicle according to this embodiment is in the control for returning the vehicle 10 to the charging station 76, and the explanation that follows is therefore focused on this point.

Figure 10:
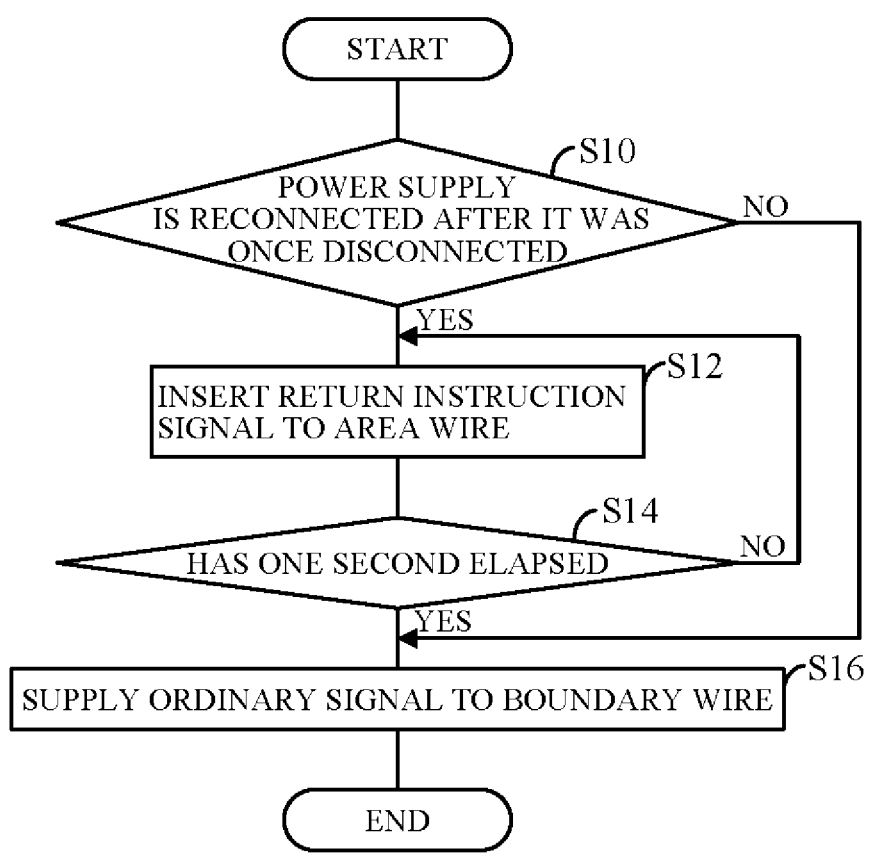
FIG. 10 is a flowchart showing operation of the control apparatus shown in FIG. 1.
Figure 11:
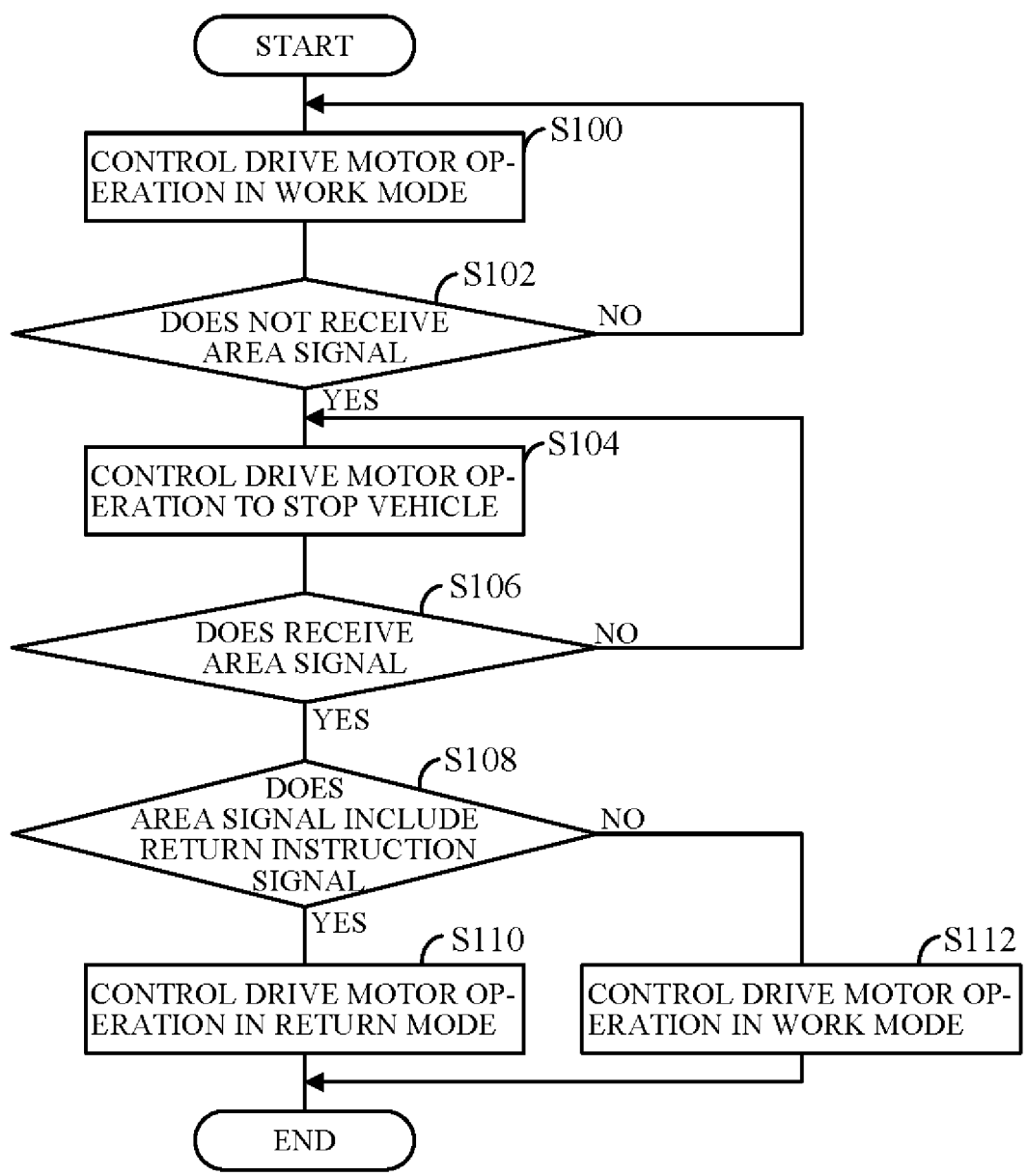
FIG. 11 is a flowchart also showing operation of the control apparatus shown in FIG. 1.

FIGS. 10 and 11 are flowcharts showing operations of the control apparatus for a utility vehicle. The programs shown are executed by the charging ECU 84b of the charging ST 76 and the ECU 44.

More specifically, as shown in FIG. 5, the charging ECU (electronic control unit) 84b, more precisely the charging ECU (electronic control unit) 84b has a CPU (microprocessor) and a memory wherein the microprocessor is configured to function as a reconnection determining unit (determining means) 84b1 and a return instruction signal inserting unit (inserting means) 84b2, and as shown in FIG. 3, the CPU 44a of the ECU 44 has a running control unit (or control means) 44a1. The processing operations shown in FIGS. 10 and 11 are performed by the reconnection determining unit 84b1 and return instruction signal inserting unit 84b2 of FIG. 5 and the running control unit 44a1 of FIG. 3.

Now to explain, in S10, it is determined whether after the electric power supply 80 was once turned OFF, i.e., after the user once cut off supply of power from the electric power supply 80 to the boundary wire 72 at the socket 82 by the user, a reconnection action for reconnecting is performed.

When the result in S10 is YES, the program goes to S12, in which the aforesaid return instruction signal is inserted to the area signal 72a of binary data signal. More specifically, the aforesaid return instruction signal is inserted (selected) at a predetermined bit (e.g., first bit) of the 64-bit signal constituting the area signal 72a explained with reference to FIG. 6.

Next, in S14, it is determined whether a predetermined time period such as 1 sec has elapsed, and so long as the result is NO, the program returns to S12 to repeat the foregoing processing, i.e., continues to insert the return instruction signal to the area signal 72a.

On the other hand, when YES, the program advances to S16, in which an ordinary area signal 72a is supplied to the boundary wire 72, i.e., the area signal 72a whose first bit is not the return instruction signal is selected and supplied to the boundary wire 72. When the result in S10 is NO, the processing of S12 to S14 is skipped.

FIG. 11 is a flowchart showing processing executed by the ECU 44 (more exactly, its running control unit 44a1) in parallel with the operation of the charging ECU 84b of FIG. 10, and FIGS. 12A to 12B are related explanatory diagrams.

Now to explain, in S100, assuming work mode to be in effect, operation of the drive motor 26 is controlled and the utility unit (blade) 20 is driven to carry out lawn mowing work while running through the working area AR (FIG. 12A).

Next, in S102, it is determined whether area signal 72a is not being received, and when the result is NO, the program returns to S100 to perform lawn mowing work, and when YES, goes to S104, in which operation of the drive motor is controlled to stop the vehicle 10 (FIG. 12B).

Next, in S106, it is determined whether area signal 72a is received and when the result is NO, the program returns to S104, and when YES, goes to S108, in which it is determined whether the area signal 72a includes the return instruction signal, i.e., whether the signal corresponding to the predetermined bit of the 64 bits (first bit) is the return instruction signal.

When the result in S108 is YES, the program goes to S110, in which operation of the drive motor 26 is controlled in the return mode to make the vehicle 10 return to the charging station (FIG. 12C). On the other hand, when it is NO, the program goes to S112, in which operation of the drive motor is controlled in the work mode (FIG. 12D).

As stated above, the present embodiment is configured to have an apparatus and method for controlling operation of a utility vehicle (10) that detects a magnetic field generated by an area signal (72a) in electric current supplied from an electric power supply (80) through a boundary wire (72) laid around a working area (AR) and is driven by an electric motor (drive motor 26) powered by an onboard battery that is to be charged at a charging station (76) to run within the working area based on the detected magnetic field, comprising: a connecting/disconnecting device (socket 82) that is installed at a location between the electric power supply (80) and the boundary wire (72) to be operable by an user to connect/disconnect supply of the electric current from the electric power supply (80) to the boundary wire (72); an electronic control unit (charging ECU 84b) having a microprocessor and a memory, wherein the microprocessor is configured to function as: a reconnection determining unit (84b1, S10) configured to determine whether after power supply from the electric power supply (80) to the boundary wire (72) was once disconnected, the power supply from the electric power supply (80) to the boundary wire (72) is reconnected by the connecting/disconnecting device (82); a return instruction signal inserting unit (84b2, S12, S14) configured to insert a return instruction signal indicating the vehicle to return to the charging station to the area signal (72a) when the reconnection determining unit determines that the power supply is reconnected; and an electronic control unit (ECU 44b1) having a microprocessor (CPU 44a) and a memory (44c), wherein the microprocessor is configured to function as: a running control unit (44a1, S100-S112) configured to control operation of the electric motor (26) to make the vehicle (10) run to the charging station (76) when the reconnection determining unit inserts the return instruction signal to the area signal (72a).

With this, it becomes possible to easily return the vehicle 10 to the charging station as required, such as when the weather turns bad or maintenance is to be performed, without adding a station return switch or any other physical component.

In the apparatus and method, the return instruction signal inserting unit (84b2) continues to insert the return instruction signal to the area wire (72a) for a predetermined time period when the reconnection determining unit determines that the power supply is reconnected.

With this, it becomes possible to return the vehicle 10 to the charging station without fail.

In the apparatus and method, the area signal (72a) is supplied to the boundary wire (72) at random period (Tn).

With this, in addition to the advantages and effects mentioned above, it become possible to prevent interference with another area signal generated from a neighboring boundary wire.

In the apparatus and method, the area signal (72a) comprise a predetermined bits of digital data signals and the return instruction signal is inserted at any bit of the digital data signal.

In the apparatus and method, the area signal (72a) comprises a 64-bit digital signal and the return instructing signal is inserted at a first bit of the 64-bit digital signal.

In the apparatus and method, the running control unit (44a1) configured to control operation of the electric motor (26) to make the vehicle (10) operate in work mode and to make the vehicle (10) return to the charging station in return mode and controls operation of the electric motor (26), when the vehicle (10) operates in the work mode, switches to the return mode if the return instruction signal is inserted to the area wire (72a).

In the above, it should be noted that although the utility vehicle is applied for a lawn mowing or grass mowing, it may applied to any other type of works.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of a utility vehicle that detects a magnetic field generated by an area signal in electric current supplied from an electric power supply through a boundary wire installed around a working area and is driven by an electric motor powered by an onboard battery that is to be charged at a charging station to run within the working area based on the detected magnetic field, comprising:
a connecting/disconnecting device that is installed at a location between the electric power supply and the boundary wire to be operable by a user to connect/disconnect supply of the electric current from the electric power supply to the boundary wire; and
an electronic control unit having a microprocessor and a memory,
wherein the microprocessor is configured to function as:
a reconnection determining unit configured to determine whether after power supply from the electric power supply to the boundary wire was once disconnected, the power supply from the electric power supply to the boundary wire is reconnected by the connecting/disconnecting device;
a return instruction signal inserting unit configured to insert a return instruction signal indicating the vehicle to return to the charging station on the area signal when the reconnection determining unit determines that the power supply is reconnected; and
a running control unit configured to control operation of the electric motor to make the vehicle run to the charging station when the return instruction signal inserting unit inserts the return instruction signal on the area signal.

2. The apparatus according to claim 1, wherein the return instruction signal inserting unit continues to insert the return instruction signal on the area wire for a predetermined time period when the reconnection determining unit determines that the power supply is reconnected.

3. The apparatus according to claim 1, wherein the area signal is supplied to the boundary wire at a random period.

4. The apparatus according to claim 1, wherein the area signal comprises predetermined bits of digital data signals, and the return instruction signal is inserted at any bit of the digital data signal.

5. The apparatus according to claim 4, wherein the area signal comprises a 64-bit digital signal, and the return instructing signal is inserted at a first bit of the 64-bit digital signal.

6. The apparatus according to claim 1, wherein the running control unit is configured to control operation of the electric motor to make the vehicle operate in work mode and to make the vehicle return to the charging station in return mode, and controls operation of the electric motor, when the vehicle operates in the work mode, to switch to the return mode if the return instruction signal is inserted on the area signal.

7. A method for controlling operation of a utility vehicle that detects a magnetic field generated by an area signal in electric current supplied from an electric power supply through a boundary wire installed around a working area and is driven by an electric motor powered by an onboard battery that is to be charged at a charging station to run within the working area based on the detected magnetic field, and having a connecting/disconnecting device that is installed at a location between the electric power supply and the boundary wire to be operable by a user to connect/disconnect supply of the electric current from the electric power supply to the boundary wire, the method comprising the steps of:
determining whether after power supply from the electric power supply to the boundary wire was once disconnected, the power supply from the electric power supply to the boundary wire is reconnected by the connecting/disconnecting device;
inserting a return instruction signal indicating the vehicle to return to the charging station on the area signal when the step of reconnection determining determines that the power supply is reconnected; and
controlling operation of the electric motor to make the vehicle run to the charging station when the step of return instruction signal inserting inserts the return instruction signal on the area signal.

8. The method according to claim 7, wherein the step of return instruction signal inserting continues to insert the return instruction signal on the area wire for a predetermined time period when the step of reconnection determining determines that the power supply is reconnected.

9. The method according to claim 7, wherein the area signal is supplied to the boundary wire at a random period.

10. The method according to claim 7, wherein the area signal comprises predetermined bits of digital data signals, and the return instruction signal is inserted at any bit of the digital data signal.

11. The method according to claim 10, wherein the area signal comprises a 64-bit digital signal, and the return instructing signal is inserted at a first bit of the 64-bit digital signal.

12. The method according to claim 7, wherein the step of running controlling controls operation of the electric motor to make the vehicle operate in work mode and to make the vehicle return to the charging station in return mode, and controls operation of the electric motor, when the vehicle operates in the work mode, to switch to the return mode if the return instruction signal is inserted on the area signal.

* * * * *